(12) United States Patent
Strauch

(10) Patent No.: US 9,850,027 B2
(45) Date of Patent: Dec. 26, 2017

(54) DEVICE FOR SECURING GOODS TO BE TRANSPORTED ONTO A LOAD CARRIER

(71) Applicant: Alexander Strauch, Gimbsheim (DE)

(72) Inventor: Alexander Strauch, Gimbsheim (DE)

( * ) Notice: Subject to any disclaimer, the term of this patent is extended or adjusted under 35 U.S.C. 154(b) by 0 days.

(21) Appl. No.: 14/906,062

(22) PCT Filed: Jun. 20, 2014

(86) PCT No.: PCT/DE2014/200272
§ 371 (c)(1),
(2) Date: Jan. 19, 2016

(87) PCT Pub. No.: WO2015/007281
PCT Pub. Date: Jan. 22, 2015

(65) Prior Publication Data
US 2016/0152378 A1  Jun. 2, 2016

(30) Foreign Application Priority Data
Jul. 19, 2013 (DE) .................. 10 2013 214 223

(51) Int. Cl.
*B65D 19/44* (2006.01)
*F16B 25/10* (2006.01)

(52) U.S. Cl.
CPC ............ *B65D 19/44* (2013.01); *F16B 25/106* (2013.01); *B65D 2519/00815* (2013.01)

(58) Field of Classification Search
CPC ..... B65D 19/44; Y10S 248/907; Y10T 24/29; B61D 45/007
See application file for complete search history.

(56) References Cited

U.S. PATENT DOCUMENTS

| 1,485,140 A | 2/1924 | Mccormick |
| 2,443,684 A | 6/1948 | Lazarus |
| 2,702,641 A | 2/1955 | Arthur |

(Continued)

FOREIGN PATENT DOCUMENTS

| DE | 1043952 B | 11/1958 |
| DE | 4111692 C2 | 1/1994 |

(Continued)

OTHER PUBLICATIONS

The International Bureau of WIPO, International Preliminary Report on Patentability (English translation of ISA's Written Opinion) for International Application No. PCT/DE2014/200272, dated Jan. 19, 2016, 7 pages, Switzerland.

(Continued)

*Primary Examiner* — Bradley Duckworth
(74) *Attorney, Agent, or Firm* — Alston & Bird LLP

(57) ABSTRACT

A device for securing goods (1) to be transported onto a load carrier (2), in particular a pallet (2), having a rod-shaped fastening element (3), which can be fastened to the load carrier (2), and a retaining element (4) for engaging with the goods (1) to be transported, said retaining element cooperating with the fastening element (3), is designed and developed, with regard to secure fastening of goods to be transported with universal usability and ease of handling, in such a way that a thread (5) for fastening to the load carrier (2) is formed at an end of the fastening element (3).

5 Claims, 4 Drawing Sheets

(56) References Cited

U.S. PATENT DOCUMENTS

| | | | |
|---|---|---|---|
| 3,018,537 A * | 1/1962 | Imparato | F16B 7/10 24/288 |
| 3,050,802 A * | 8/1962 | Imparato | B65D 67/02 24/288 |
| 3,217,892 A | 11/1965 | Goodell | |
| 3,638,802 A * | 2/1972 | Westerfield | B65F 1/141 211/85.19 |
| 3,760,974 A * | 9/1973 | Oglesbee | A47G 23/0208 206/427 |
| 3,779,502 A * | 12/1973 | Marberg | B65D 19/44 410/116 |
| 4,403,556 A | 9/1983 | Van Gompel | |
| 4,774,892 A * | 10/1988 | Ballard | B23Q 1/032 108/55.1 |
| 5,176,265 A * | 1/1993 | Bennett | A47F 7/28 108/55.5 |
| 5,190,273 A | 3/1993 | Salvagnini | |
| 5,450,961 A * | 9/1995 | Gottfried | B65D 19/44 206/386 |
| 5,497,708 A * | 3/1996 | Jeruzal | B65D 19/44 108/54.1 |
| 6,073,768 A | 6/2000 | McCord et al. | |
| 6,488,253 B1 * | 12/2002 | Piccolomini | B65F 1/141 24/601.5 |
| 2004/0018046 A1 | 1/2004 | Daly | |

FOREIGN PATENT DOCUMENTS

| | | |
|---|---|---|
| DE | 20211288 U1 | 1/2004 |
| JP | S51-144657 U | 11/1976 |
| JP | H01-170619 U | 12/1989 |
| JP | 2004-060888 A | 2/2004 |
| JP | 2007-326649 A | 12/2007 |
| JP | 2008-195425 A | 8/2008 |
| JP | 2010-276577 A | 12/2010 |

OTHER PUBLICATIONS

International Searching Authority, International Search Report (ISR) and Written Opinion for International Application No. PCT/DE2014/200272, dated Oct. 24, 2014, 13 pages, European Patent Office, The Netherlands.

Japan Patent Office, Notification of Reason for Refusal for Application No. 2016-526452, dated Aug. 8, 2017, 7 pages, Japan.

* cited by examiner

Cut A - A

DEVICE FOR SECURING GOODS TO BE TRANSPORTED ONTO A LOAD CARRIER

CROSS REFERENCE TO RELATED APPLICATIONS

This application is a national stage application, filed under 35 U.S.C. §371, of International Application No. PCT/DE2014/200272, filed Jun. 20, 2014, which claims priority to German Application No. 10 2013 214 223.4, filed Jul. 19, 2013, the contents of both of which as are hereby incorporated by reference in their entirety.

BACKGROUND

A device for securing goods to be transported onto a load carrier, in particular a pallet, having a rod-shaped fastening element, which can be fastened to the load carrier, and a retaining element for engaging with the goods to be transported, said retaining element cooperating with the fastening element.

Devices of the class in question are known from the prior art. For instance, DE 41 11 692 C2 relates to a transport pallet for barrels having a bracket 26 fastened to a tray pallet 10, said bracket 26 having a rod-shaped fastening element 24 and retaining elements 38, 42 fastened to said fastening element 24 with an additional bracket 30. This allows barrels to be secured to the specially configured transport pallet. In addition, JP 2010-276577 A relates to a device to secure barrels, having a fastening element 1 that features a fork-shaped end 3 with which the fastening element 1 can be engaged into a pallet suited for said purpose. The fastening element 1 also comprises a thread 4 on the end facing away from the pallet, wherein a retaining element 2 that cooperates with the fastening element 1 can be fastened to the fastening element 1 with a nut 6.

A disadvantage of the known devices to secure goods to be transported is that these can only be used on specially manufactured or suited load carriers. Universal usability of the different load carriers is not given. The known securing devices are also problematic in that these are difficult to handle. For instance, said securing devices consist of several different components that must be held during the fastening procedure and/or must be engaged with great care, or several fastening elements and/or positioning elements must be handled even when only one barrel is secured.

BRIEF SUMMARY

The present invention therefore has the task of designing and developing a device of the type named above in a manner that facilitates secure fastening of goods to be transported while also providing universal usability and ease of handling.

According to the invention, the task above is addressed by a device having the features of claim 1. Pursuant to this, the device in question is designed and developed in such a manner that a thread for fastening to the load carrier is formed at the end of the fastening element.

In a manner according to the invention, the invention initially recognizes that ease of handling for securing goods to be transported is facilitated when the fastening element can be fastened directly to the load carrier. For this purpose, a thread formed at the end of the fastening element is used for fastening onto the load carrier. This facilitates a particularly simple and strong design of the device according to the invention since the fastening element can be fastened directly to the load carrier, e.g. for instance to a pallet. In this case, the fastening is accomplished only from one side, that is to say by screw-mounting the fastening element from above. This also supports universal usability since such a fastening method supports fastening to any type of load carrier and therefore also to pallets, for instance to the Euro pallets widely used in the freight forwarding sector. This results in a particularly secure fastening of the goods to be transported onto the load carrier since the fastening element, which acts via the retaining element and its thread, can exert a high tensile force in the direction of the load carrier. This reliably secures the goods to be transported onto the load carrier, therefore also ensuring a secure retention even when the load carrier tips. Additional securing with straps, foils, or ropes is not required. This results in ease of handling while also implementing a strong retention of the goods to be transported.

Accordingly, a device according to the invention results in a device of the type mentioned above designed and developed in such a manner that goods to be transported are securely fastened while also being universally usable and easy to handle.

The term goods to be transported in the present case shall be interpreted in the broadest sense. For instance, the secured goods to be transported can be containers, barrels, drums, etc. The thread at the end of the fastening element can be formed as a self-tapping thread. In this case, the thread can be designed as on a wood screw or on a sheet-metal screw, so that the thread creates a counter-thread in the load carrier—said counter-thread matching the thread—as the fastening element is fastened to the load carrier itself. The thread of the fastening element is an outside thread. The design as a self-tapping thread facilitates use of the device on any type of load carrier without preparing the load carrier. In this regard, the device can for instance be used on a conventional Euro pallet, wherein no damage is created that prevents continued use of the pallet, so that the pallet can subsequently be reused in typical fashion. Provisioning of specially prepared or fabricated load carriers or pallets is therefore not required.

By way of an alternative design, the thread can be formed as a metric or inch thread, and a counter-thread matching the thread can be formed in or on the load carrier. It is, for instance, conceivable to form the counter-thread that matches the thread as an inner thread of a bushing or sleeve fastened onto the load carrier. In this case, the counter-thread matches the outer thread of the fastening element configured as a metric or inch thread. As a means for particularly simple positioning of the fastening element when the load carrier is in the loaded state, the end of the bushing or sleeve facing away from the load carrier can have a conical section and/or a section with an expanding diameter to facilitate inserting the fastening element in a simple manner, even when the bushing or sleeve is no longer visible for the worker loading the load carrier because said bushing or sleeve is concealed by the goods to be transported.

In particular, the retaining element can have a through hole or a bore for the fastening element, and the fastening element can have a radially expanded section as a contact surface on the retaining element. Accordingly, this creates a simple design for a strong abutment, so that the interaction of the retaining element and the fastening element transfers a large force, allowing the goods to be transported to be securely fastened to the load carrier. In order to avoid an injury risk for the worker, it is conceivable that the through hole has a counter-bore or recess, in particular a conical counter-bore or cylindrical recess, so that the radially extended section of the fastening element is supported in the pocket, recess, or counter-bore.

The fastening element can have a screw head on the end interacting with the retaining element. The screw head can be configured in the shape of a countersunk head. This creates a simple design since the radially expanded section is configured as a screw head. In case of a pocket or recess, the screw head can be entirely accommodated therein, resulting in an essentially level surface on the retaining element. A counter-bore on the through hole and a design of the screw head in the shape of a countersunk head are advantageous, resulting in a large tensile force transfer due to the large surface area created in this manner. In an alternative advantageous embodiment, the screw head can be configured as a flathead or a countersunk panhead with a preferably pressed-on washer. This also allows the goods to be transported to be very securely fastened to the load carrier.

By way of a particularly simple design implementation, the fastening element can be configured as a screw. In addition to ease of handling, this also facilitates exerting large forces on the screw, allowing the goods to be transported to be securely fastened to the load carrier. The screw can have various screw head drive mechanisms, such as hex socket, Philips, Pozidriv, or Torx screw head drive. A configuration with a screw head drive in the shape of a knurled screw or a wing screw is equally conceivable, allowing the screw to be tightened or loosened without tools. In particular, this contributes toward ease of handling of the device when the thread of the fastening element is formed as a metric or inch thread and a counter-thread that matches the thread.

The retaining element can have at least one arc-shaped pocket or groove to accommodate a rim of the load carrier. Pocket or groove shall in this case be interpreted in the broadest sense, therefore referring to any configuration that accommodates a rim of the goods to be transported in a complementary manner. In this regard, it can be a pocket, groove, recess or a fold formed in the retaining element.

In regards to the design implementation of the retaining element, it is conceivable that this is made from plastics. In addition to the low weight of the plastic, this also implements a corrosion-resistant design. This also largely prevents damage to the goods to be transported. For purposes of engaging with the goods to be transported, e.g. drums or barrels, the retaining element—if made from plastics—can have an arc-shaped pocket or groove. If the retaining element has two or four arc-shaped pockets, the retaining element can be used to secure two or four barrels respectively drums onto the load carrier, that is to say by only fastening one fastening element into the load carrier. However, a design with three arc-shaped pockets is also useful, so that three goods to be transported, e.g. three barrels or drums, can be securely fastened. For this purpose, the retaining element could have an essentially triangular shape with the pockets preferably along the corners of the triangle.

The retaining element can also be designed from metal, in particular from aluminum or steel sheet-metal. This facilitates a strong design of the retaining element. Due to the high elasticity of steel sheet-metal, a design in particular from steel sheet-metal can exert a high clamping force on the goods to be transported without plastic deformation of the retaining element. The retaining element can be easily and cost-effectively manufactured by way of a clamping and/or pressing process. In order to increase the shape stability of the retaining element, indentations or ribs can be formed for stiffening purposes.

For damping purposes, the retaining element can have sections or inserts made from plastics or rubber, or the like in the region of the pocket or groove. The section or inserts can prevent damage to the goods to be transported. This also facilitates a particularly secure engagement with a rim of the goods to be transported, advantageously creating a complementary engagement due to the sections or inserts.

BRIEF DESCRIPTION OF THE FIGURES

At this point, there are various options for developing and implementing the teaching of the present invention in an advantageous manner. For this purpose, reference is hereby made on the one hand to the claims dependent on claim 1, and on the other hand to the following explanation of preferred exemplary embodiments of the invention with reference to the drawings. Along with the explanation of the preferred exemplary embodiments of the invention based on the drawing, other generally preferred embodiments and implementations of the teaching are explained as well. The drawings show:

DETAILED DESCRIPTION OF VARIOUS EMBODIMENTS

Figure 1:
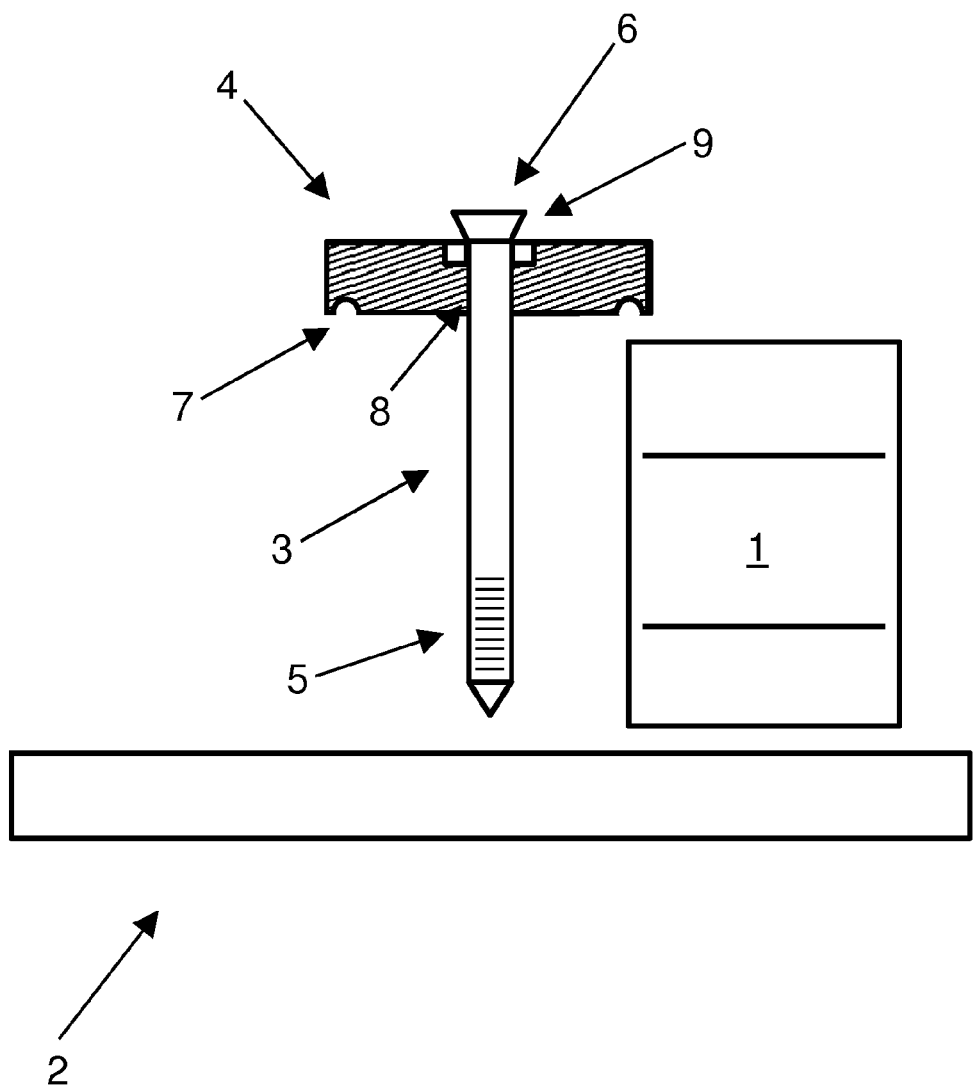
FIG. 1 an exemplary embodiment of a device according to the invention rendered as a partial cross-section, FIG. 2 a first exemplary embodiment of a retaining element of a device according to the invention in a top view, FIG. 3 a second exemplary embodiment of a retaining element of a device according to the invention in a top view, and FIG. 4 a second exemplary embodiment of a retaining element of a device according to the invention in a cross-section side-view along line A-A.

FIG. 1 shows an exemplary embodiment of a device according to the invention rendered as a partial cross-section, The device is used to secure goods to be transported 1 onto a load carrier 2. The load carrier 2 in the present exemplary embodiment is configured as a pallet 2. The device has a rod-shaped fastening element 3 fastenable to pallet 2 and a retaining element 4 that cooperates with the fastening element 3 to engage with the goods to be transported 1. The goods to be transported 1 in the present exemplary embodiment is a barrel 1.

The fastening element 3 in the present exemplary embodiment is configured as a screw 3 with a self-tapping thread 5 on the end facing the pallet 2. The screw 3 has a screw head 6 that is configured as a countersunk head. On the side facing the barrel 1, the retaining element 4 has an arc-shaped pocket 7 that can engage in a complementary manner with a rim of the barrel 1.

The retaining element 4 has a through hole 8 or a bore 8 for the screw 3. The screw head 6 can be accommodated in a pocket 9. The screw head 6 also has a screw head drive with a Torx shape. Using a suitable tool, e.g. a screw driver or a battery-powered driver, the screw 3 can be fastened into the pallet 2 and can be subsequently loosened.

Barrels 1 are secured to the pallet 2 as follows:

The barrels 1, e.g. two or four barrels are initially positioned on the pallet 2. The retaining element 4 is then positioned on the barrels 1 in such a manner that the pockets or grooves 7 engage with the rims of the barrels 1 in a complimentary manner. Using a suitable tool, e.g. a screw driver or a battery-powered driver, the screw 3 is then fastened into the pallet 2. This accomplishes a secure and strong attachment of the barrels 1 to the pallet 2.

Figure 2:
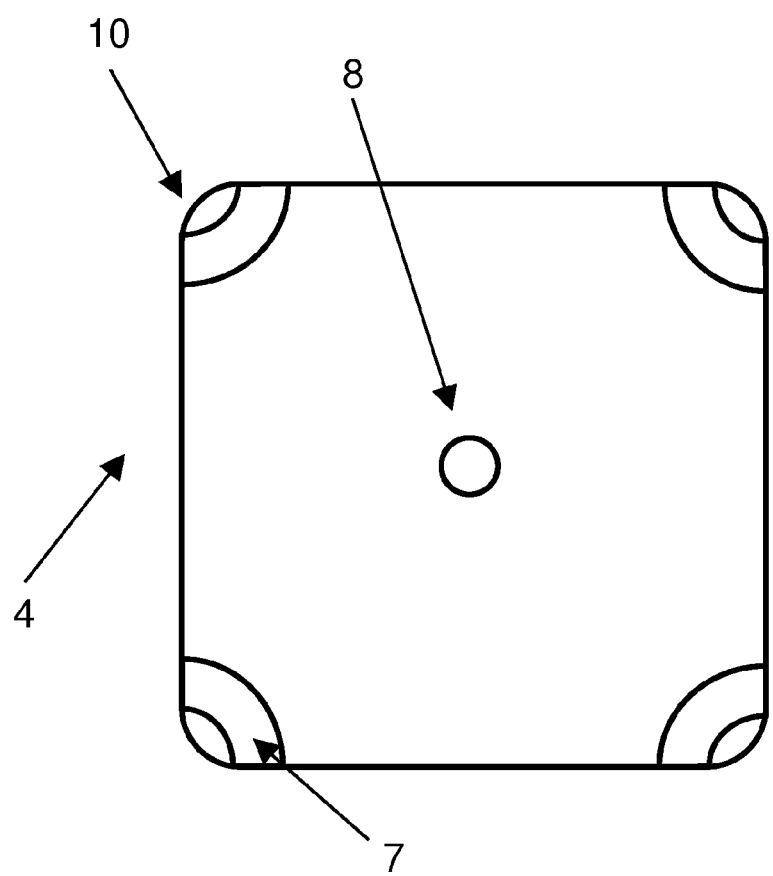

FIG. 2 shows a first exemplary embodiment of a retaining element of a device according to the invention in a top view. The retaining element 4 has a rectangular or square design with chamfered or rounded edges 10, which are only identified with a single reference for clarity. The through hole 8 for the screw 3 is formed in the center of the retaining element 4. The retaining element 4 has arc-shaped grooves 7 to engage with the rims of the barrels in a complementary manner. The grooves 7 have an essentially semi-circular-shaped cross-section, therefore facilitating a complementary engagement with the barrel rims. The retaining element 4 according to this exemplary embodiment is made from plastics.

Figure 3:
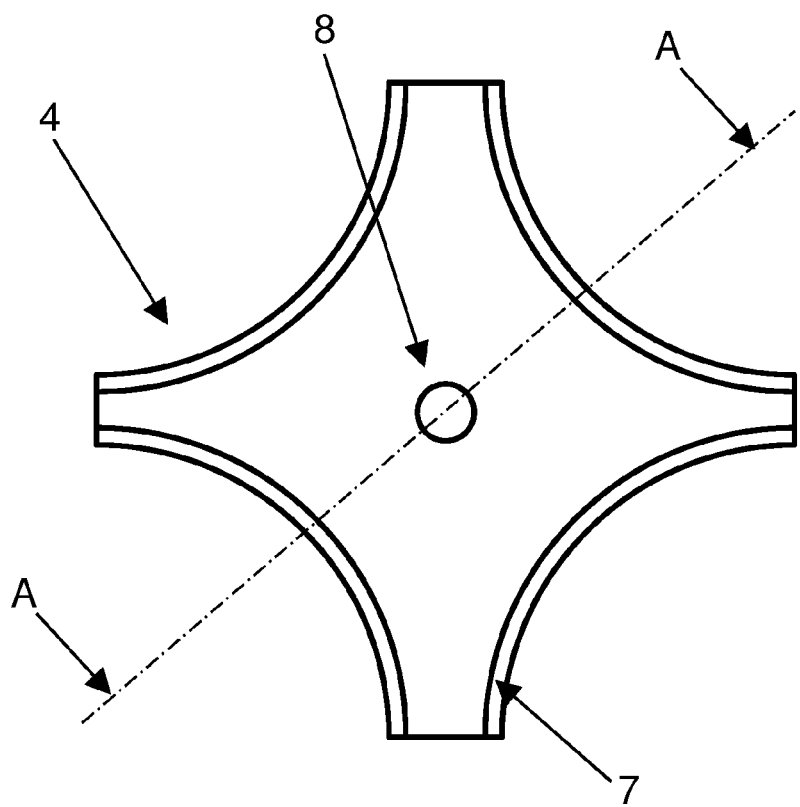

FIG. 3 shows a second exemplary embodiment of a retaining element of a device according to the invention in a top view. The retaining element 4 has an essentially rhombic base shape, wherein pockets or grooves 7 are formed on the rims of the retaining element 4 to accommodate the barrel rims. The through hole 8 for the screw 3 is formed in the center of the retaining element 4. The retaining element 4 in the present exemplary embodiment is made from steel sheet-metal and is fabricated by means of a pressing and/or stamping process.

Figure 4:
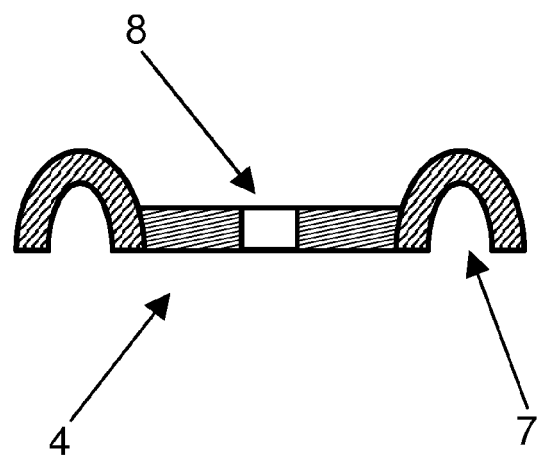

FIG. 4 shows second exemplary embodiment of a retaining element of a device according to the invention in a cross-section side-view along section A-A (see FIG. 3). The pockets or grooves 7 in the present exemplary embodiment are formed as a fold 7 designed to accommodate barrel rims in a complementary manner.

In a manner according to the invention, the invention initially recognizes that ease of handling for securing goods to be transported is facilitated when the fastening element can be fastened directly to the load carrier. For this purpose, a thread formed at the end of the fastening element is used for fastening onto the load carrier. This facilitates a particularly simple and strong design of the device according to the invention since the fastening element can be fastened directly to the load carrier, e.g. for instance to a pallet. In this case, the fastening is accomplished only from one side, that is to say by screw-mounting the fastening element from above. This also supports universal usability since such a fastening method supports fastening to any type of load carrier and therefore also to pallets, for instance to the Euro pallets widely used in the freight forwarding sector. This results in a particularly secure fastening of the goods to be transported onto the load carrier since the fastening element, which acts via the retaining element and its thread, can exert a high tensile force in the direction of the load carrier. This reliably secures the goods to be transported onto the load carrier, therefore also ensuring a secure retention even when the load carrier tips. Additional securing with straps, foils, or ropes is not required. This results in ease of handling while also implementing a strong retention of the goods to be transported.

Accordingly, a device according to the invention results in a device of the type mentioned above designed and developed in such a manner that goods to be transported are securely fastened while also being universally usable and easy to handle.

The term goods to be transported in the present case shall be interpreted in the broadest sense. For instance, the secured goods to be transported can be containers, barrels, drums, etc. The thread at the end of the fastening element can be formed as a self-tapping thread. In this case, the thread can be designed as on a wood screw or on a sheet-metal screw, so that the thread creates a counter-thread in the load carrier—said counter-thread matching the thread—as the fastening element is fastened to the load carrier itself. The thread of the fastening element is an outside thread. The design as a self-tapping thread facilitates use of the device on any type of load carrier without preparing the load carrier. In this regard, the device can for instance be used on a conventional Euro pallet, wherein no damage is created that prevents continued use of the pallet, so that the pallet can subsequently be reused in typical fashion. Provisioning of specially prepared or fabricated load carriers or pallets is therefore not required.

By way of an alternative design, the thread can be formed as a metric or inch thread, and a counter-thread matching the thread can be formed in or on the load carrier. It is, for instance, conceivable to form the counter-thread that matches the thread as an inner thread of a bushing or sleeve fastened onto the load carrier. In this case, the counter-thread matches the outer thread of the fastening element configured as a metric or inch thread. As a means for particularly simple positioning of the fastening element when the load carrier is in the loaded state, the end of the bushing or sleeve facing away from the load carrier can have a conical section and/or a section with an expanding diameter to facilitate inserting the fastening element in a simple manner, even when the bushing or sleeve is no longer visible for the worker loading the load carrier because said bushing or sleeve is concealed by the goods to be transported.

In particular, the retaining element can have a through hole or a bore for the fastening element, and the fastening element can have a radially expanded section as a contact surface on the retaining element. Accordingly, this creates a simple design for a strong abutment, so that the interaction of the retaining element and the fastening element transfers a large force, allowing the goods to be transported to be securely fastened to the load carrier. In order to avoid an injury risk for the worker, it is conceivable that the through hole has a counter-bore or recess, in particular a conical counter-bore or cylindrical recess, so that the radially extended section of the fastening element is supported in the pocket, recess, or counter-bore.

The fastening element can have a screw head on the end interacting with the retaining element. The screw head can be configured in the shape of a countersunk head. This creates a simple design since the radially expanded section is configured as a screw head. In case of a pocket or recess, the screw head can be entirely accommodated therein, resulting in an essentially level surface on the retaining element. A counter-bore on the through hole and a design of the screw head in the shape of a countersunk head are advantageous, resulting in a large tensile force transfer due to the large surface area created in this manner. In an alternative advantageous embodiment, the screw head can be configured as a flathead or a countersunk panhead with a preferably pressed-on washer. This also allows the goods to be transported to be very securely fastened to the load carrier.

By way of a particularly simple design implementation, the fastening element can be configured as a screw. In addition to ease of handling, this also facilitates exerting large forces on the screw, allowing the goods to be transported to be securely fastened to the load carrier. The screw can have various screw head drive mechanisms, such as hex socket, Philips, Pozidriv, or Torx screw head drive. A configuration with a screw head drive in the shape of a knurled screw or a wing screw is equally conceivable, allowing the screw to be tightened or loosened without tools. In particular, this contributes toward ease of handling of the device when the thread of the fastening element is formed as a metric or inch thread and a counter-thread that matches the thread.

The retaining element can have at least one arc-shaped pocket or groove to accommodate a rim of the load carrier. Pocket or groove shall in this case be interpreted in the broadest sense, therefore referring to any configuration that accommodates a rim of the goods to be transported in a complementary manner. In this regard, it can be a pocket, groove, recess or a fold formed in the retaining element.

In regards to the design implementation of the retaining element, it is conceivable that this is made from plastics. In addition to the low weight of the plastic, this also implements a corrosion-resistant design. This also largely prevents damage to the goods to be transported. For purposes of engaging with the goods to be transported, e.g. drums or barrels, the retaining element—if made from plastics—can have an arc-shaped pocket or groove. If the retaining element has two or four arc-shaped pockets, the retaining element can be used to secure two or four barrels respectively drums onto the load carrier, that is to say by only fastening one fastening element into the load carrier. However, a design with three arc-shaped pockets is also useful, so that three goods to be transported, e.g. three barrels or drums, can be securely fastened. For this purpose, the retaining element could have an essentially triangular shape with the pockets preferably along the corners of the triangle.

The retaining element can also be designed from metal, in particular from aluminum or steel sheet-metal. This facilitates a strong design of the retaining element. Due to the high elasticity of steel sheet-metal, a design in particular from steel sheet-metal can exert a high clamping force on the goods to be transported without plastic deformation of the retaining element. The retaining element can be easily and cost-effectively manufactured by way of a clamping and/or pressing process. In order to increase the shape stability of the retaining element, indentations or ribs can be formed for stiffening purposes.

For damping purposes, the retaining element can have sections or inserts made from plastics or rubber, or the like in the region of the pocket or groove. The section or inserts can prevent damage to the goods to be transported. This also facilitates a particularly secure engagement with a rim of the goods to be transported, advantageously creating a complementary engagement due to the sections or inserts.

Finally, explicit reference is made to the fact that the exemplary embodiments of the device according to the invention described above are used only for explanation of the claimed teaching, but the teaching is not restricted to the exemplary embodiments.

REFERENCE LIST

1 Goods to be transported, barrel
2 Load carrier, pallet
3 Fastening element, screw
4 Retaining element
5 Thread
6 Screw head
7 Pocket, groove
8 Through hole, bore
9 Recess, counter-bore
10 Chamfer, rounding

The invention claimed is:

1. Device to secure barrels or drums to be transported (1) onto a pallet (2), the device consisting of:
   a rod-shaped fastening element (3) that is configured for selectively fastening to the pallet (2); and
   a retaining element (4) that cooperates with the rod-shaped fastening element (3) and that is positionable on the barrels or drums to engage with the barrels or drums to be transported (1),
   wherein:
   the rod-shaped fastening element (3) is a screw with a screw head (6) on the end that cooperates with the retaining element (4) and with a self-tapping thread (5) at the other end of the screw for directly fastening to the pallet (2) by screw-mounting the screw into the pallet (2);
   the retaining element (4) has at least one side having a first length, at least one side having a second length, and at least one arc-shaped pocket or groove (7) for accommodating a rim of the barrels or drums to be transported (1);
   the first length is greater than the second length; and
   the at least one arc-shaped pocket or groove (7) has a curvature extending along the first length of the at least one side, the curvature of the at least one arc-shaped pocket or groove being congruent to a curvature of the at least one side having the first length.

2. Device according to claim 1, wherein:
   the retaining element (4) has a through hole (8) for the fastening element (3).

3. Device according to claim 1, wherein the retaining element (4) is formed from a plastic material.

4. Device according to claim 1, wherein the retaining element (4) is formed from a metal material.

5. Device according to claim 4, wherein the metal material is at least one of aluminum or steel sheet-metal.

* * * * *